US012650884B2

(12) United States Patent
Chen et al.

(10) Patent No.: US 12,650,884 B2
(45) Date of Patent: Jun. 9, 2026

(54) METHOD OF DETERMINING AN ARTIFICIAL INTELLIGENCE MODULE FOR USE IN DEPLOYING COMPUTING TASKS ON CLIENT COMPUTING APPARATUS

(71) Applicant: Orange, Issy-les-Moulineaux (FR)

(72) Inventors: Yanjun Chen, Beijing (CN); Yu Liu, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 1092 days.

(21) Appl. No.: 17/620,058

(22) PCT Filed: Jun. 15, 2020

(86) PCT No.: PCT/IB2020/000531
§ 371 (c)(1),
(2) Date: Dec. 16, 2021

(87) PCT Pub. No.: WO2020/260946
PCT Pub. Date: Dec. 30, 2020

(65) Prior Publication Data
US 2022/0308931 A1      Sep. 29, 2022

(51) Int. Cl.
*G06F 9/46*          (2006.01)
*G06F 9/50*          (2006.01)
(52) U.S. Cl.
CPC .......... *G06F 9/5072* (2013.01); *G06F 9/5044* (2013.01); *G06F 9/5055* (2013.01); *G06F 2209/509* (2013.01)
(58) Field of Classification Search
None
See application file for complete search history.

(56) References Cited

U.S. PATENT DOCUMENTS

| | | |
|---|---|---|
| 2018/0268302 A1 | 9/2018 | Tosh |
| 2019/0156246 A1* | 5/2019 | Kuo .......................... G06N 5/04 |
| 2020/0143250 A1* | 5/2020 | Lee ........................ G06N 3/082 |

OTHER PUBLICATIONS

Zhou et al; Adaptive Quantization for Deep Neural Network, AAAI, Apr. 29, 2018 (Year: 2018).*
International Search Report and Written Opinion dated Oct. 12, 2020 for Application No. PCT/IB2020/000531.

* cited by examiner

*Primary Examiner* — Bing Zhao
(74) *Attorney, Agent, or Firm* — Knobbe, Martens, Olson & Bear, LLP

(57)          ABSTRACT
A computer-implemented method of deploying a computing task to client computing apparatus is described. The method comprises identifying a plurality of alternative artificial intelligence modules which can accomplish the computing task, determining the settings of the client computing apparatus, and determining, based on the settings of the client computing apparatus and on the requirements specifications of the artificial intelligence modules, whether the client computing apparatus is capable of implementing one or more of the modules to perform the computing task. If so, the method includes selecting a module from among said one or more artificial intelligence modules and outputting, to the client computing apparatus, data enabling the client computing apparatus to implement the selected artificial intelligence module. A corresponding computer system, computer program and computer program product are described.

16 Claims, 5 Drawing Sheets

TSK

ID MODS    S10

DET SETT    S20

IMP ?    S30

NO

YES

SEL MOD    S40

O/P MOD PARAM    S50

S60

ERR

FIG.5

| Name of model | Performance | | Memory (MB) | | MFLOPS |
|---|---|---|---|---|---|
| | top 1 error | top 5 error | Feat. | Param. | |
| alexnet | 41.80 | 19.20 | 3 | 233 | 727 |
| caffenet | 42.60 | 19.70 | 3 | 233 | 724 |
| googlenet | 34.20 | 12.90 | 26 | 51 | 2000 |
| resnet-18 | 30.24 | 10.92 | 23 | 45 | 2000 |
| resnet-34 | 26.70 | 8.58 | 35 | 83 | 4000 |
| resnet-50 | 24.60 | 7.70 | 103 | 98 | 4000 |
| resnet-101 | 23.40 | 7.00 | 155 | 170 | 8000 |
| resnet-152 | 23.00 | 6.70 | 219 | 230 | 11000 |
| squeezenet1-0 | 41.90 | 19.58 | 30 | 5 | 837 |
| squeezenet1-1 | 41.81 | 19.38 | 17 | 5 | 360 |
| vgg-f | 41.40 | 19.10 | 4 | 232 | 727 |
| vgg-m | 36.90 | 15.50 | 12 | 393 | 2000 |
| vgg-m-128 | 40.80 | 18.40 | 12 | 315 | 2000 |
| vgg-m-1024 | 37.80 | 16.10 | 12 | 333 | 2000 |
| vgg-m-2048 | 37.10 | 15.80 | 12 | 353 | 2000 |
| vgg-s | 37.00 | 15.80 | 12 | 393 | 3000 |
| vgg-vd-16 | 28.50 | 9.90 | 58 | 528 | 16000 |
| vgg-vd-16-atrous | - | - | 58 | 82 | 16000 |
| vdd-vd-19 | 28.70 | 9.90 | 63 | 548 | 20000 |

METHOD OF DETERMINING AN ARTIFICIAL INTELLIGENCE MODULE FOR USE IN DEPLOYING COMPUTING TASKS ON CLIENT COMPUTING APPARATUS

RELATED APPLICATIONS

This application is the U.S. National Phase of Application No. PCT/IB2020/000531 entitled "METHOD OF DEPLOYING COMPUTING TASKS ON CLIENT COMPUTING APPARATUS" and filed Jun. 15, 2020, which claims the benefit of Patent Application No. PCT/CN2019/093104, filed Jun. 26, 2019, each of which is incorporated by reference in its entirety.

FIELD OF THE INVENTION

The present invention relates to the field of fog or edge computing and, more particularly, to computer-implemented methods of deploying computing tasks on client computing apparatus, to systems implementing such methods and to computer programs and computer program products used to implement such methods.

TECHNICAL BACKGROUND

Fog and edge computing are becoming more popular as the number and computing power of intelligent devices progressively increase, and as the volume of data produced, for example, by IoT devices starts to impose constraints on cloud computing paradigms. It is becoming possible to leverage a wider variety of computing tasks, e.g. artificial intelligence tasks, to client devices of various kinds including, but not limited to, personal computers, tablets, smart phones, IoT devices, routers, smart watches, intelligent cars, smart surveillance cameras, and so on.

There are numerous advantages in deploying computing tasks on client apparatus so that some or all of the computation is performed at or closer to the edge of a network, which often is a location where the results of the computing may be used. For instance, in the case where a robot or self-driving car requires performance of an artificial intelligence task, for example object recognition or automatic navigation, latency is lower in the case where the computing inherent in the AI task is performed by the car itself, rather than being performed in the cloud. As another example, in the case where a smart camera performs the computing inherent in a facial recognition task the camera itself can recognise faces of individuals it photographs, without needing to transfer large volumes of data over a network to a data centre for processing. In addition to advantages in terms of lower latency and reduced bandwidth requirements for data transmission over a network, fog and edge computing provide various other advantages, for example, data security may be improved.

In many cases the edge/fog computing that is devolved to the client apparatus consists in exploiting an artificial intelligence module which has been developed/trained in the cloud or at another location outside the client apparatus. For example, it may be desired to devolve to a fog or edge node the use of a machine learning architecture which has been developed and trained at a cloud node.

Different computing tasks require different resources in order to achieve a desired level of performance. If a client computing apparatus having limited resources attempts to implement a complex machine learning module having stringent technical requirements then it is likely that there will be unexpected performance degradation. On the other hand, if powerful client apparatus is used to implement a relatively simple machine learning module this is wasteful of computing resources.

The present invention has been made in the light of the above issues.

SUMMARY OF THE INVENTION

The present invention provides a computer-implemented method of deploying computing tasks on client computing apparatus, a corresponding system, computer program and computer program product.

In an embodiment, a computer-implemented method of deploying a computing task to client computing apparatus comprises:

identifying a plurality of alternative artificial intelligence modules which can accomplish the computing task, each module being associated with a respective requirements specification, determining the settings of the client computing apparatus, determining, based on the settings of the client computing apparatus and on the requirements specifications of the artificial intelligence modules, whether the client computing apparatus is capable of implementing one or more of the modules to perform the computing task, and in the case where it is determined that the computing apparatus is capable of implementing one or more of the artificial intelligence modules to perform said computing task, selecting a module from among said one or more artificial intelligence modules, and outputting, to the client computing apparatus, data enabling the client computing apparatus to implement the selected artificial intelligence module.

The computer-implemented method according to the invention uses module selection to actively fit artificial intelligence tasks to the settings of deployed edge or fog devices according to the limitations of the latter devices (e.g. in terms of technical specifications, resources, and so on). This helps to avoid possible performance degradation.

The method may further comprise determining, based on the settings of the client computing apparatus and on the requirements specifications of compressed versions of the artificial intelligence modules, whether the client computing apparatus is capable of implementing one or more of the compressed modules to perform the computing task, and in the case where it is determined that the computing apparatus is capable of implementing one or more compressed modules to perform said computing task: selecting a compressed module from among said one or more compressed modules, and outputting, to the client computing apparatus, data enabling the client computing apparatus to implement the selected compressed artificial intelligence module.

In the latter case, module compression as well as module selection can be exploited to achieve an even better fit of the computing task to the capabilities of the client computing device. It can be considered that the artificial intelligence modules are "adapted" to the client computing apparatus by the module selection and/or module compression.

In certain embodiments of the method, the requirements specifications of compressed modules are considered after it has been determined that no artificial intelligence module can be implemented on the client computing apparatus to obtain the targeted performance level. In this way, the computing task can be deployed on the client computing apparatus even when this apparatus does not have the capability to implement any of the usual (uncompressed) modules.

In some embodiments, the selecting of a module, or compressed module, from among plural possibilities that could all be implemented on the client computing apparatus can involve preferentially selecting a module or compressed module whose requirements specification most closely matches the settings of the client computing apparatus without exceeding the capabilities of the client computing apparatus. These embodiments provide improved efficiency in the use of computing/storage resources.

Various settings of the client computing apparatus may be taken into account when adapting the artificial intelligence modules to the capabilities of the client computing apparatus. For example, one or more of the following may be taken into account: the technical specification, the available resources and the state of the client computing apparatus.

The client computing apparatus may be monitored in an ongoing manner so that changes in the resources available to it, or changes in its state, can be noted and taken into account when adapting the artificial intelligence modules to the capabilities of the client computing apparatus.

The method may comprise determining the settings of a plurality of client computing apparatuses and determining which (if any) of these is capable of implementing one or more of the artificial intelligence modules to perform the computing task. The determination is based on the settings of the plurality of client computing apparatuses and on the requirements specifications of the various artificial intelligence modules. A selection may then be made as to the client computing apparatus upon which the computing task will be deployed.

Similarly, the method may comprise identifying, for each of a plurality of different computing tasks, a plurality of alternative artificial intelligence modules which can accomplish said computing task and determining which (if any) of these tasks is capable of being implementing on a target client computing apparatus by running one of the available AI modules. The determination is based on the settings of the target client computing apparatus and on the requirements specifications of the various artificial intelligence modules. Plural client computing apparatuses may be considered as the target client computing apparatus and the distribution of tasks to client computing apparatuses may be optimized.

The latter embodiments may be exploited to provide a technique for monitoring and managing the available resources (available tasks, the status of computing devices, etc.) in a network of devices.

The present invention further provides a computer program comprising instructions which, when executed by a processor in computing apparatus, cause the computing apparatus to perform any of the above-described methods. The present invention yet further provides a computer program product comprising such a computer program.

The present invention still further provides a computer system comprising a processor configured to execute a computer program to cause the computer system to perform any of the above-described methods.

BRIEF DESCRIPTION OF THE DRAWINGS

Further features and advantages of the present invention will become apparent from the following description of

Figure 1A:
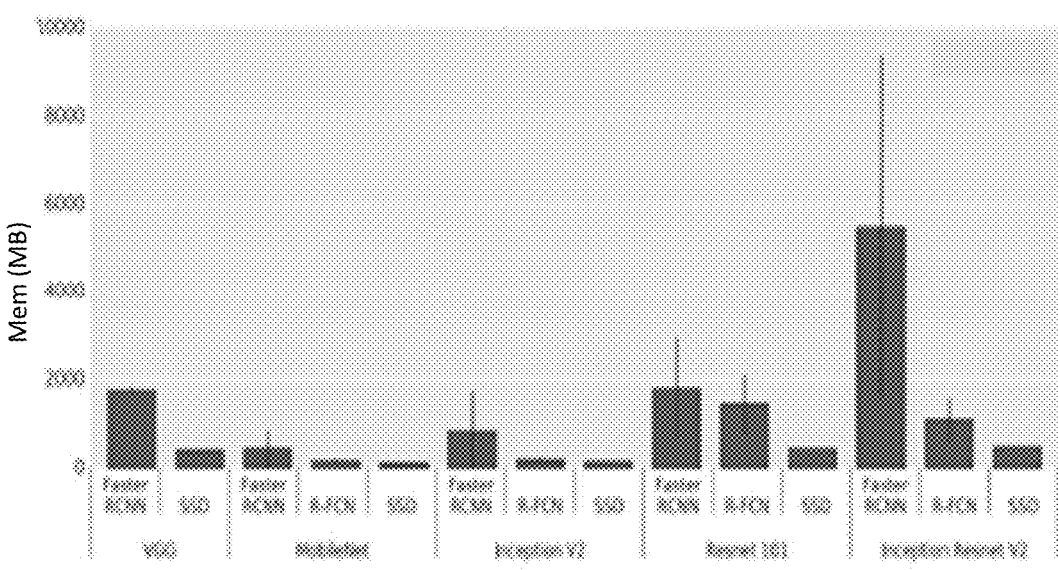
Figure 1B:
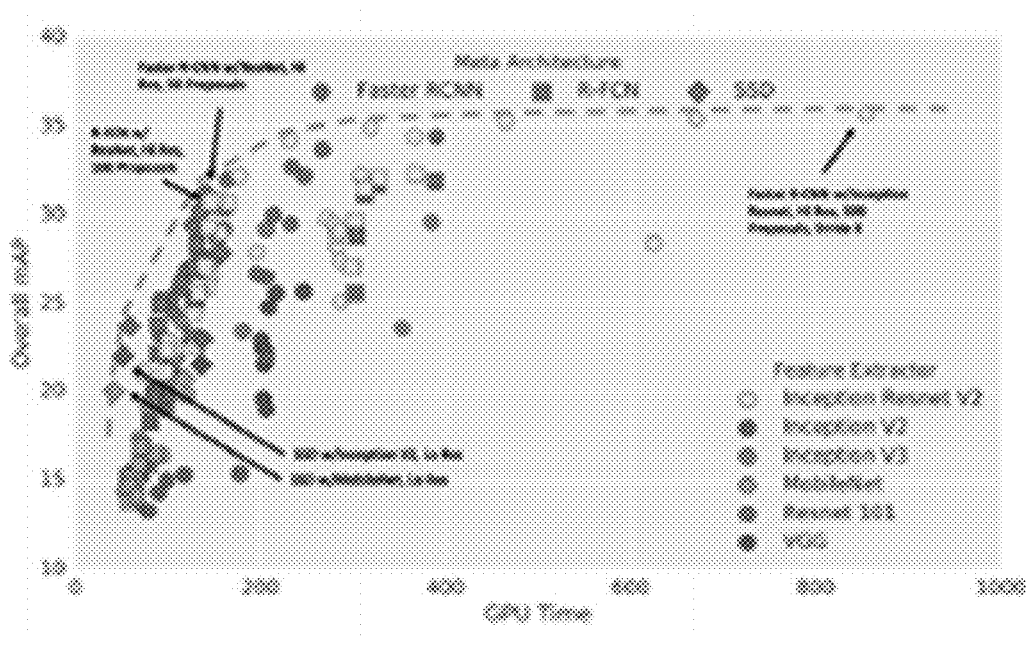
Figures 2, 3:
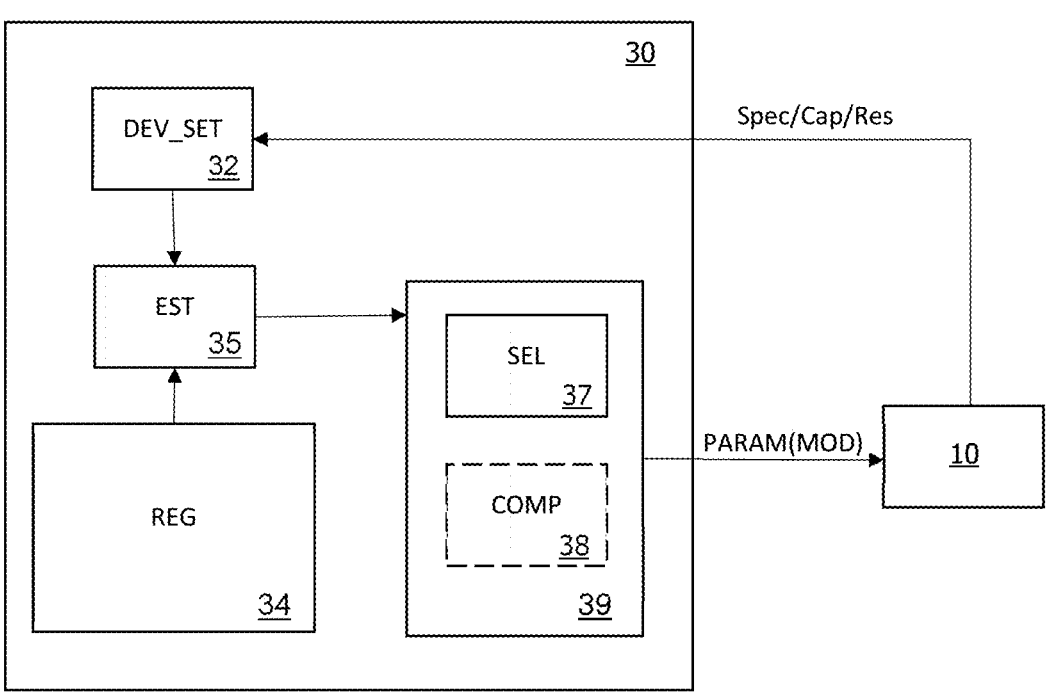
Figure 4:
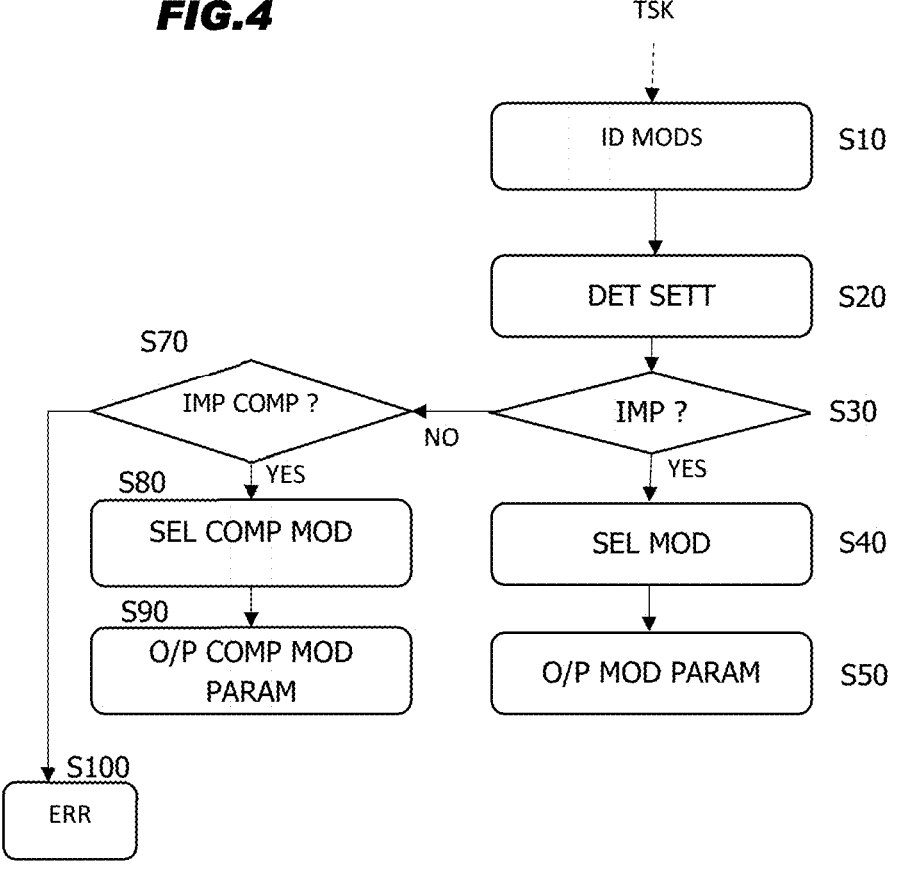
Figure 6:
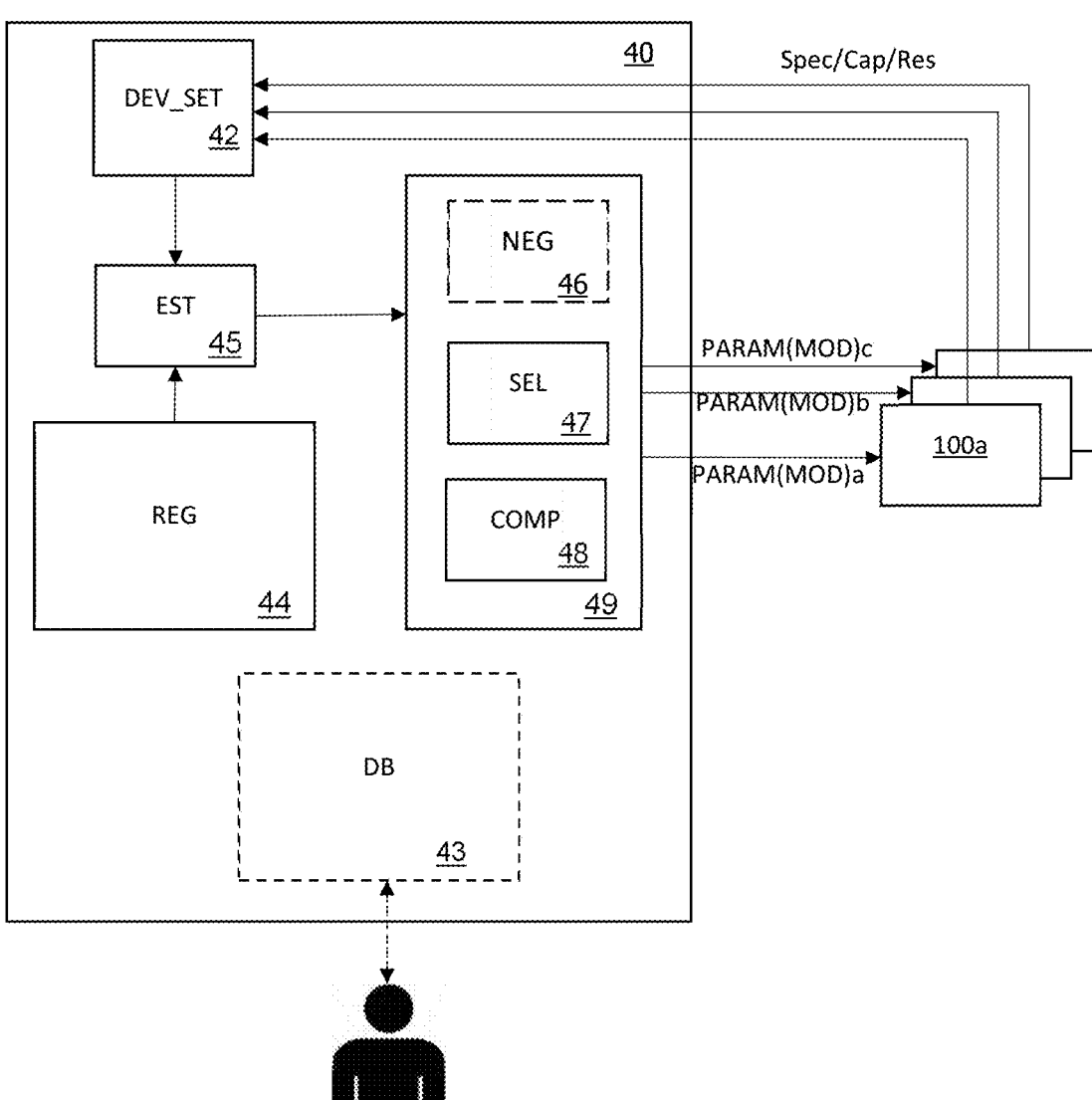

4 certain embodiments thereof, given by way of illustration only, not limitation, with reference to the accompanying drawings in which:

FIG. 1 shows graphs illustrating how alternative artificial intelligence modules, used to implement the same computing task, may require different resources and may achieve different performance levels, in which:

FIG. 1A illustrates memory requirements of different artificial intelligence modules, and FIG. 1B illustrates performance levels achieve by different artificial intelligence modules;

FIG. 2 is a functional block diagram that schematically illustrates components in an embodiment of a system to deploy a computing task on client computing apparatus;

FIG. 3 is a flow diagram illustrating an embodiment of a computer-implemented method to deploy a computing task on client computing apparatus;

FIG. 4 is a flow diagram illustrating another embodiment of computer-implemented method to deploy a computing task on client computing apparatus;

FIG. 5 shows an example of a table listing various alternative artificial intelligence modules that can be used to perform a computing task, their requirements specifications and the associated performance levels that can be achieved;

FIG. 6 is a functional block diagram that schematically illustrates components in an embodiment of a brokerage-type system to deploy computing tasks on different client computing apparatuses.

DETAILED DESCRIPTION OF EXAMPLE
EMBODIMENTS

The present invention provides embodiments of computer-implemented methods and systems which optimize deployment of computing tasks on client computing apparatus taking into account the settings of the client computing apparatus, notably the technical capabilities, resources and/or state of the client computing apparatus (in terms of its hardware and/or software). Incidentally, in this document "client computing apparatus" designates devices that have computing capability or computing/storage resources, even if computing/processing is not the primary function of the device in question. Moreover, the expression "client computing apparatus" is not restricted to designating a single device (e.g. a smart surveillance camera), it can designate a group of devices (e.g. a smart watch and smart phone) cooperating to implement a task that has been deployed on them jointly.

It is often the case that a given artificial intelligence task can be implemented using a variety of alternative artificial intelligence modules and, typically, the resource requirements of the modules vary from one another, for example in terms of memory occupancy, the required number of computing operations/second, and so on. The performance of the different modules may also vary. These points are illustrated by FIGS. 1A and 1B.

FIGS. 1A and 1B relate to the case where an image recognition task is performed using a computing apparatus which has 32 Gb of RAM, an Intel Xeon E5-1650 v2 processor and an Nvidia Geforce GTX Titan X GPU card, the GPU card itself having 12 Gb of RAM.

FIG. 1A illustrates how much memory (in Mb) this computing apparatus needs to use in order to implement various alternative machine learning modules of varying complexity to accomplish the target image recognition task at a resolution of 300. FIG. 1A illustrates more particularly an example of the required memory amounts in the case where the implemented machine learning modules comprise convolutional neural networks of various different meta-architecture (Faster RCNN, SSD, R-FCN) having various different kinds of feature extractors (VGG, MobileNet, Inception V2, Resnet 101, and Inception Resnet V2) for extracting features from the analyzed images. It can be seen from FIG. 1A that the amount of memory that the computing apparatus needs to use varies by nearly an order of magnitude depending on the specific trained machine-learning module that the computing apparatus implements in order to perform the targeted image recognition task.

The different feature extractors (VGG, Inception Net, etc.) used in the image recognition modules have a major influence on the performance that is achieved, e.g. on the recognition accuracy, speed, and so on. A commonly-used metric for quantifying performance in image recognition tasks is "mean average precision" (mAP). FIG. 1B illustrates how mAP varies when the different machine learning modules are implemented by the computing apparatus, working at high resolution or low resolution, and in cases where the number of proposals of regions of interest vary. It can be seen from FIG. 1B that the mAP varies significantly depending on the specific trained machine-learning module that the computing apparatus implements in order to perform the targeted image recognition task.

The present invention exploits the fact that computing tasks can be accomplished by implementing different artificial intelligence modules. More particularly, the invention provides embodiments of systems and computer-implemented methods which, when deploying a given computing task to some target client computing apparatus, adapts the computing task to the settings of the target client computing device by selecting, from among various artificial intelligence modules that could be employed to accomplish the target computing task, a module (or a compressed module) whose technical requirements/performance match the settings of the target client computing apparatus and a targeted performance level. The "settings" of the client computing apparatus that are taken into account may include one or more of the technical specification, available resources and current state of the target computing apparatus.

FIG. 2 is a functional block diagram illustrating components of a system 30, according to an example embodiment of the present invention, to deploy a computing task on client computing apparatus 10. The client computing apparatus 10 may, for example, be a fog node or an edge node.

In the embodiment illustrated in FIG. 2 the task-deployment system 30 is embodied on a cloud node, but the invention is not limited to this case; the system 30 may be embodied on one or more cloud nodes, servers, and so on. The task deployment system 30 comprises a settings storage unit 32, a module registry 34, a performance estimator 35, and a task adaptor 39 (comprising a selector unit 37 and a module compressor 38).

The settings storage unit 32 holds details of the settings of the client computing apparatus 10, notably the settings which affect the capability of the client computing apparatus 10 to implement artificial intelligence modules. The settings storage unit 32 may hold data indicative of the technical specification of the client computing device, for instance: one or more of processor details (number of cores, manufacturer, model name, speed, number of bits, etc.), details of memory (e.g. RAM capacity and type) and storage (e.g. HDD capacity and type), GPU details (speed, manufacturer, model name, number of bits, etc.), and so on.

Initial values for the settings of a target client computing apparatus may be loaded into the settings storage unit 32 in a variety of ways including, but not limited to: manual pre-programming, a device-discovery process performed automatically, etc. The settings storage unit 32 may monitor the client computing apparatus so as to keep up-to-date with changes in the specification, capacity, resources and/or state of the client computing apparatus 10.

The module registry 34 holds details of various alternative artificial intelligence modules that can be used to accomplish a particular computing task. The registry 34 holds, for each of the alternative artificial intelligence modules:

an identifier of the module (e.g. a name, an identification code, etc.) permitting each module to be distinguished individually from the others, and details of the requirements specification of the module (e.g. the size of the module and the number of operations required to perform an iteration of the task).

The registry 34 may also hold information regarding the expected performance achievable using each artificial intelligence module.

In general, a single system 30 may manage deployment of a plurality of different computing tasks on one or more client computing apparatuses 10. In such cases, the settings storage unit 32 hold data indicating the settings of each client computing apparatus on which tasks may be deployed, and the registry 34 holds data indicating which artificial intelligence modules may be used to accomplish each specific computing task.

In the embodiment represented in FIG. 2, the task-deployment system 30 includes a performance estimator 35 which performs an evaluation based upon the capabilities of a target client computing apparatus 10 (as represented by the settings retrieved from settings storage unit 32 for this target apparatus 10) and the module specifications (as represented by the requirements specifications held, for each module, in the registry 34). The performance estimator 35 determines whether the client computing apparatus 10: can implement one or more of the alternative artificial intelligence modules and, upon doing so, manage to achieve a target performance level. The task adaptor 39 adapts the computing task to the capabilities of the target client computing apparatus 10, based on the output of the performance estimator 35, by employing a module selector 37 to select from among the artificial intelligence modules which can be implemented by the client computing apparatus 10 in order to obtain the target performance level.

Optionally, the task adaptor 39 may comprise a module compressor 38 and can determine whether or not it is necessary to perform module compression in order to produce code that can be implemented on the client computing apparatus 10 to achieve the target performance level.

The task adaptor 39 deploys the adapted module to the computing device 10 with a view to obtaining best performance. Typically, the task adaptor 39 is configured to select the nodule, or compressed module, which—when implemented by the client computing apparatus 10—will produce the best performance. However, other selection criteria may be applied. For example, the task adaptor may preferentially select the module or compressed module whose requirements specification best matches the capabilities of the client computing apparatus 10, without exceeding those capabilities, whilst still yielding performance that meets a target performance level. If desired a cost function may be defined to enable the task adaptor 39 to weight different selection criteria.

Deployment of the adapted module to the client computing apparatus 10 may take different forms. Typically, the task-deployment system outputs, to the client computing apparatus, data (Param(MOD)) that is necessary and sufficient to enable the client computing apparatus 10 to implement the adapted module to perform one or more instances of the computing task (e.g. recognition of one specified object, performance of one navigation operation, etc.).

It should be mentioned that, typically, the system illustrated in FIG. 2 is implemented using one or more processors programmed to implement the functionality described above. However, the invention is not limited having regard to the extent to which the described functionality is achieved using hardware, software or a combination of hardware and software. Similarly, the described functionality can be distributed over a larger or smaller number of functional units than those illustrated in FIG. 2.

FIG. 3 is a flow diagram that illustrates a computer-implemented method of deploying a computing task on client computing apparatus, according to an embodiment of the present invention.

The method illustrated in FIG. 3 begins by identifying (S10) a plurality of artificial intelligence modules that are each suitable to accomplish a target computing task. The target computing task, TSK, may be input from outside or may already have been pre-programmed. In the next step, S20, the settings of a target client computing apparatus 10 are determined. The order of performance of steps S10 and S20 is not critical and can be reversed. Then, a determination is made (S30) as to whether the client computing apparatus 10 is capable of implementing one or more of the artificial intelligence modules to achieve a target performance level. If the determination made in step S30 is positive, then one of the modules is selected (S40) for implementation on the client computing apparatus. The data necessary to enable the client computing apparatus to implement the selected module is then output (S50) to the client computing apparatus. If the determination S30 gives a negative result, then an error message may be generated (S60).

FIG. 4 is a flow diagram that illustrates a computer-implemented method of deploying a computing task on client computing apparatus, according to another embodiment of the present invention.

The method illustrated in FIG. 4 includes steps S10 to S50 of the method of FIG. 3. However, in the case of the present embodiment, when the determination made in step S30 is negative, the method goes on to determine (S70) whether or not the client computing apparatus 10 is capable of implementing one or more compressed versions of the artificial intelligence modules to achieve the target performance level. If the determination made in step S30 is positive, then one of the modules is selected (S40) for implementation on the client computing apparatus. The data necessary to enable the client computing apparatus to implement the selected module is then output (S50) to the client computing apparatus. If the determination S30 gives a negative result, then an error message may be generated (S60).

A specific example of an application of the method of FIG. 4 by the system of FIG. 3 will now be described to illustrate the remarks given above. This specific example relates to the case where the targeted computing task is a face recognition task. This is but one example of the myriad computing tasks that can be handled by embodiments of the invention.

In this example, the registry 34 of AI modules contains details of various modules that can accomplish face recognition. The registry 34 holds details of the "requirements specifications" of these modules in terms of the number of operations and size of memory required by a module. For example, for a ResNet51 based face recognition module, it may require about 25 Megabytes of memory for the storage of module parameters, and in total it needs 300 MegaFlops for one inference computing.

In this example, the hardware and software settings of the client computing apparatus 10 are synchronized with the controller sited in the cloud and include hardware settings such as: CPUs, CPU current usage status, CPU architecture, memory, etc. Software settings include: OS version (Linux 4.7.x kernel, UNIX, or windows, etc.).

In step S40, "module selection" implies that, for this face ID task, several AI modules are possible and one of them is selected to be deployed on the computing edge node after having checked that it is compatible with the capacities of this computing edge node.

However, if, in step S30, it is determined that no appropriate module is available, a module compression may be required to fit the module to the target client computing device. A commonly used compression method would be Model Quantization. Model linear quantization is a widely used and efficient method for compressing AI models that correspond to the Ai modules that are to be deployed. Basically, the idea is to compress the model by quantizing the float parameters to integer. Normally, when a Machine Learning model is trained, all the computation and parameters are stored in float (which normally takes 32 bits). However, all the parameters can be compressed and the inference speed can be accelerated by quantizing them to integer values (8 bits normally). Details can be found in the following document: Quantization and Training of Neural Networks for Efficient Integer-Arithmetic-Only Inference (arxiv.org/abs/1712.05877), which is hereby incorporated by reference.

The "adapted model" generated at the end of step S40 or S80 therefore corresponds to either a selected model or, if none available, a compressed model.

Another example of the functioning of the system illustrated in FIG. 2 will be discussed, with reference to FIG. 4. In this example it is desired to deploy an image classification task on client computing apparatus 10. In this example, the performance target is to have an inference speed of 10 image frames per second and have at most 20% error rate (20% TOP5 error) when the image classification task is performed.

Consider the case where the target client computing apparatus 10 is an edge computing device which uses an Nvidia Jetson TX2 having the following specification:

CPU: ARM Cortex-A57 (quad-core) @ 2 GHz+NVIDIA Denver2 (dual-core) @ 2 GHz

GPU: 256-core Pascal @ 1300 MHz

Memory: 8 Gb 128-bit LPDDR4 @1866 MHz, 597 Gb/s

Storage: 32 Gb, eMMC 5.1

The maximum throughout of this device, when using a double-float precision module, should be around 5 GFLOPS, based on the following relation for calculating maximum throughput:

$$\text{Max. Throughput} = (\text{number of SMs}) \times (\text{number of FP32 units per SM}) \times 2 \times (\text{clock rate})$$

where SM stands for "stream multiprocessor".
Here, "Flops" stands for: Floating-Point Operations Per Second, and it is a measurement used to indicate how many floating point operations a microprocessor is capable of performing each second. For example, 20 Mflops is equal to 20 Million FLOPS per second.

In this example, the registry of the cloud-side (server-side) control system 30 holds details, as set out in FIG. 5, of a set of artificial-intelligence modules (trained machine-neural networks) which could be implemented on a computing device in order to accomplish the targeted computing task (image recognition).

Since the maximum throughput for the target client computing apparatus, the Jetson TX2, is 5 GFlops, and the target performance requires processing of 10 image frames per second, then an AI module is required that involves performance of no more than 5G/10=500 MFlops. With the target error rate in mind, it can be seen from FIG. 5 that the targeted performance can only be achieved in the case where the AI module that is implemented on the target Jetson TX2 computing device is the squeezenet1-1 module.

The embodiments discussed above have dealt with the case where it is necessary to deploy a specific computing task on target client computing apparatus. However, embodiments of the invention may implement a kind of brokerage functionality, making a selection of which out of a plurality of client computing apparatuses is the one to which the computing task is to be deployed. Similarly, embodiments of the invention may implement a kind of brokerage functionality whereby individual computing tasks out of a set of tasks are distributed between members of a group of available edge/fog computing devices.

FIG. 6 is a functional block diagram illustrating an embodiment of the invention which provides a brokerage-type system to deploy computing tasks on different client computing apparatuses.

In the example illustrated in FIG. 6, the task-deployment system 40 has a plurality of different computing tasks that it wishes to implement and has access to a plurality of client computing apparatuses 100*a*, 100*b* and 100*c* which could be used to implement computing tasks. If desired, the computing tasks may be managed (set-up, cancelled, scheduled, etc.) by a user via an AI dashboard 43.

In the example illustrated in FIG. 6, the task-deployment system 40 has a settings storage unit 42 which is configured to hold details of the settings of each of the plurality of client computing apparatuses 100*a*, 100*b* and 100*c*, and has a registry 44 which holds details of various alternative AI modules which can implement the various different computing tasks. When the task-deployment system 40 seeks to deploy a given one of its computing tasks, it may use a performance estimator 45 to determine whether any of the available client computing apparatuses 100*a*-100*c* is capable of implementing any of the applicable AI modules to achieve the target performance level associated with this task. If plural client computing apparatuses and/or plural AI modules could be used to accomplish the task to a satisfactory performance level, a selection is made (of module and/or of client computing apparatus), for example by a task adaptor 49 or, if preferred, by a control unit (not shown). Compressed modules may be considered for implementation, if appropriate. The task adaptor may include a module selector 47 and module compressor 48 in a similar manner to the system 30 of FIG. 2.

Before deploying an individual task on a given client computing apparatus, the task-deployment system 40 may evaluate a group of computing tasks in order to find an efficient distribution of tasks between the various client computing apparatuses that are available. The task-deployment system 40 may be configured to adopt a task deployment in which one or more of the individual tasks may not be deployed on the optimal client computing apparatus but, overall efficiency in utilisation of the available apparatuses is optimized.

In some applications a negotiation unit 46 may be provided in the system 40 to communicate with the client computing devices 100*a*-100*c* and negotiate terms upon which the client computing apparatus will undertake a given computing task.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A computer-implemented method of deploying a computing task to client computing apparatus, the method implemented by a task-deployment system comprising at least one processor and a memory, the method comprising:
identifying a plurality of alternative artificial intelligence modules which can accomplish the computing task, each artificial intelligence module being associated in a module registry with a respective requirements specification,
determining settings of a client computing apparatus, said settings comprising available resources of the client computing apparatus,
determining, based on the settings of the client computing apparatus, including the available resources of the client computing apparatus, and on the requirements specifications of compressed versions of the artificial intelligence modules, whether the client computing apparatus is capable of implementing a compressed version of one or more of the artificial intelligence modules to perform the computing task, and
upon a determination that that the computing apparatus is capable of implementing a compressed version one or more of the artificial intelligence modules to perform said computing task, selecting an artificial intelligence module from among said one or more artificial intelligence modules,
adapting the selected intelligence module to the client computing apparatus by compressing the selected artificial intelligence module using model quantization; and
outputting, to the client computing apparatus, data indicative of the selected artificial intelligence module and enabling the client computing apparatus to implement the model quantization compressed version of the selected artificial intelligence module.

2. The method of claim 1, wherein the selecting of a module from among the one or more modules comprises preferentially selecting a compressed version of an artificial intelligence module whose requirements specification most closely matches the settings of the client computing apparatus without exceeding the capabilities of the client computing apparatus.

3. The method of claim 1, wherein:
the settings of the client computing apparatus comprise one or more of the technical specification and the state of the client computing apparatus.

4. The method of claim 1, further comprising monitoring the client computing apparatus to identify changes in the available resources or state of the client computing apparatus, wherein the selecting of a module takes into account one or more of the current resources and current state of the client computing apparatus as determined by the monitoring.

5. The method of claim 1, further comprising:

determining settings of a plurality of client computing apparatuses, determining, based on the settings of the plurality of client computing apparatuses and on the requirements specifications of the artificial intelligence modules, whether one or more of the client computing apparatuses is capable of implementing a compressed version of one or more of the artificial intelligence modules to perform the computing task, and upon a determination that one or more of the client computing apparatuses is capable of implementing a compressed version of one or more of the artificial intelligence modules to perform the computing task, selecting a client computing apparatus from among said one or more client computing apparatuses to implement a compressed version of the selected artificial intelligence module to perform the target computing task, adapting the selected intelligence module to the selected client computing apparatus by compressing the selected artificial intelligence module using model quantization; and outputting, to the selected client computing apparatus, data indicative of the selected artificial intelligence module and enabling the selected client computing apparatus to implement the model quantization compressed version of the selected artificial intelligence module.

6. The method of claim 1, further comprising:

identifying, for each of a plurality of different computing tasks, a plurality of alternative artificial intelligence modules which can accomplish said computing task, each artificial intelligence module being associated with a respective requirements specification, determining, based on client-computer-apparatus settings and on the requirements specifications of the artificial intelligence modules applicable to the plurality of different computing tasks, whether compressed versions of artificial intelligence modules implementing one or more of the computing tasks can be implemented by a target client computing apparatus, and upon a determination that compressed versions of the artificial intelligence modules implementing one or more of the computing tasks can be implemented by a target client computing apparatus, selecting a computing task from among said one or more computing tasks to be implemented by the target client computing apparatus, and outputting, to the target client computing apparatus, data enabling the selected client computing apparatus to implement the model quantization compressed version of the determined artificial intelligence module to accomplish the selected computing task.

7. The method of claim 1, wherein said plurality of alternative artificial intelligence modules comprise a plurality of different artificial intelligence modules which differ from one another by implementing respective different artificial intelligence models.

8. A computer system comprising a processor, the processor configured to execute a computer program to cause the computer system to implement the method of claim 1.

9. A computer program stored on a non-transitory storage medium, the computer program comprising instructions which, when executed by a processor in a computing apparatus, cause the computing apparatus to implement the method of claim 1.

10. A non-transitory, computer readable medium having stored thereon instructions which, when executed by a processor, cause the processor to implement the method of claim 1.

11. The method of claim 1, wherein identifying the plurality of alternative artificial intelligence modules which can accomplish the computing task comprises:

receiving, by the task-deployment system, data from the module registry; and identifying the plurality of alternative artificial intelligence modules which can accomplish the computing task using the received data from the module registry.

12. The method of claim 11, wherein the task-deployment system comprises the module registry.

13. The method of claim 1, wherein determining settings of the client computing apparatus comprises:

receiving, by the task-deployment system, data from a settings storage unit comprising data indicating the settings of each client computing apparatus on which tasks may be deployed; and determining the settings of the client computing apparatus using the received data from the settings storage unit.

14. The method of claim 13, wherein the task-deployment system comprises the settings storage unit.

15. The method of claim 1, wherein the task-deployment system outputs data to the client computing apparatus which is necessary and sufficient to enable the client computing apparatus to implement the model quantization compressed version of the selected artificial intelligence module.

16. The method of claim 1, wherein the task-deployment system is configured to compress the selected artificial intelligence module using model linear quantization.

\* \* \* \* \*